United States Patent [19]

Bassi

[11] Patent Number: 4,887,862
[45] Date of Patent: Dec. 19, 1989

[54] BODYWORK FOR A VEHICLE, IN PARTICULAR FOR AN AUTOMOBILE, AND PROCESS FOR MANUFACTURING IT

[75] Inventor: Aldo Bassi, Milan, Italy
[73] Assignee: Alfa Lancia Industriale S.r.l., Arese, Italy
[21] Appl. No.: 82,503
[22] Filed: Aug. 7, 1987
[30] Foreign Application Priority Data Aug. 7, 1986 [IT] Italy .................... 21440 A/86

[51] Int. Cl.$^4$ ............... B60R 27/00; E04C 2/32; B21D 35/00
[52] U.S. Cl. .................. 296/204; 29/469.5; 52/799; 296/197
[58] Field of Search .............. 296/192–194, 296/203, 204, 197, 1 F, 1.1; 280/800, 798, 795; 52/799, 801, 731; 29/469.5; 228/181, 182; 156/210, 280, 292, 79

[56] References Cited

U.S. PATENT DOCUMENTS

| | | | |
|---|---|---|---|
| 3,010,756 | 11/1961 | Barenyi | 296/204 |
| 3,067,507 | 12/1962 | Titus | 228/181 |
| 3,073,647 | 1/1963 | Beltz | 296/204 |
| 3,202,451 | 8/1965 | Auger et al. | 296/204 |
| 3,940,162 | 2/1976 | Winslow et al. | 280/781 |
| 3,940,176 | 2/1976 | Ito et al. | 296/204 X |
| 4,014,587 | 3/1977 | Eggert, Jr. | 296/204 |
| 4,510,010 | 4/1985 | Schramm | 156/210 X |
| 4,615,166 | 10/1986 | Head | 52/799 X |
| 4,730,870 | 3/1988 | DeRees | 296/204 X |

Primary Examiner—Robert J. Oberleitner
Attorney, Agent, or Firm—Charles E. Brown; Charles A. Brown

[57] ABSTRACT

An automotive bodywork constructed as a floor pan formed by a platform frame. The platform frame has a structure of the "sandwich" type. It is constructed by overlapping three sheet metal sheets. The intermediate sheet of these three metal sheets is undulated and secured to the other two sheets of metal. Each of the other two sheets of metal are integrally secured to the undulated intermediate sheet where the crests of the undulations contact each other sheet.

10 Claims, 3 Drawing Sheets

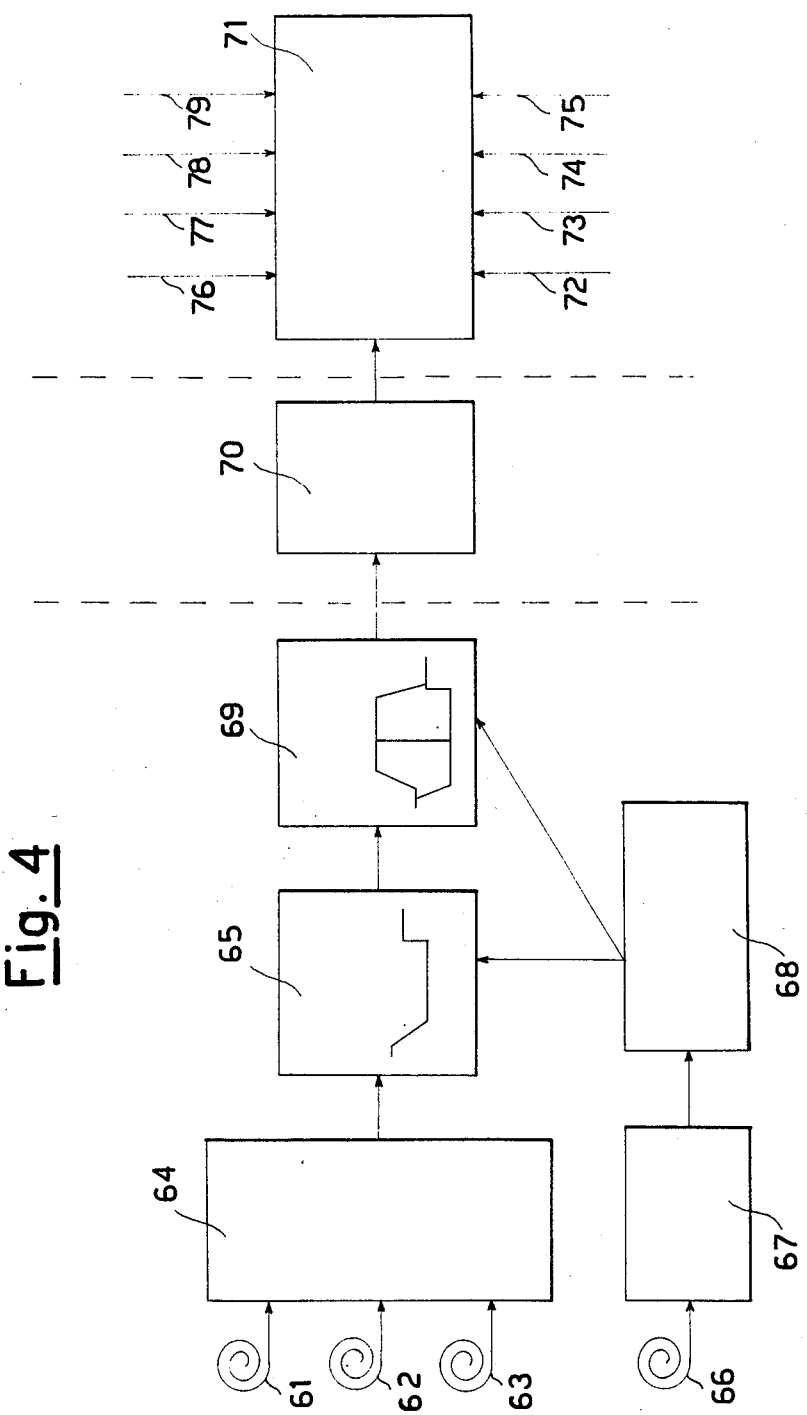

BODYWORK FOR A VEHICLE, IN PARTICULAR FOR AN AUTOMOBILE, AND PROCESS FOR MANUFACTURING IT

The present invention relates to a bodywork for a vehicle, in particular an automobile, which comprises a floor pan constituted by a platform chassis, an upper framework and an auxiliary chassis, having the function of supporting the mechanical elements, the skin and the trimming of the same vehicle.

In designing and manufacturing the coachworks for series automobiles, the most widely presently used types are those with a monocoque body, wherein nearly all of the constituents of the bodywork perform structural functions.

This type of coachwork makes it possible for a higher saving in eight to be achieved, with the strength being the same, than as saved by other solutions, of the type having a separate chassis or an integrated chassis. It also involves greater difficulties from the design standpoint, and requires large investments in the manufacturing. Therefore, it is financially advantageous in the case of large-series production only.

Furthermore, a coachwork of monocoque type does not allow transformations or model variants to be easily accomplished. It would be necessary on the contrary, for matching, within relatively short times, the technical novelties and the market demands, at least for cars produced on a limited-series basis.

A purpose of the present invention is to provide a light bodywork, which is resistant and particularly versatile. It must be suitable for mounting different types of mechanical units and to be dressed with skins of different models, in such a way that both the mechanical units and the skin can be modified rather easily and within relatively short times.

Another purpose of the invention is to provide a bodywork which can be manufactured by means of rather flexible processes. It is preferred to use general equipment for all use, rther than specific equipment for a particular model.

According to the invention, a bodywork has been designed and accomplished, which comprises a floor pan formed by a platform chassis, an upper framework and an auxiliary chassis, which are made integral with each other. It is able to support the mechanical units, the skin panels and the dressing of the vehicle. The bodywork is characterized in that at least the floor pan has a structure of "sandwich"type. It is formed by three overlapping metal sheets with two sheets having given configurations similar to each other, and with lengths shaped to give simple-curvature surfaces, such as a ruled surface. The third metal sheet is corrugated and is interposed between the first two sheets, with the crests of the undulations being made alternatively integrally attached with the one and with the other of the two above metal sheets.

Thus, a bodywork is provided, wherein the forces applied to the car can be absorbed, even totally, by the floor pan of sandwich type. The contribution supplied by the upper framework, by the auxiliary chassis, and by the skin panels, to the total flexural strength and torsional strength of the car can be minimal. Whatever the value it can be varied, as desired. In this case, the vehicle skin panels perform a covering function, and can be designed more freely, as to the asesthetical and aerodynamic characteristics.

Another advantage of the proposed solution is represented by the fact that no expensive equipment is necessary for pressing the metal sheets in manufacturing the floor pan. The desired configuration of the same floor pan is prevailingly achieved by operations of shearing and bending of the two metal sheets, i.e., the upper sheet and the lower sheet, of the "sandwich", to give simple-curvature surfaces, such as a ruled surface.

Characteristics and advantages of the invention are now illustrated by referring to the hereto attached FIGS. 1–4, wherein a preferred form of practical embodiment of the invention is shown for non-limitative exemplifying purposes.

FIG. 4 is a schematic block diagram of the process of manufacturing of a car provided with the bodywork of FIG. 1.

Figure 1:
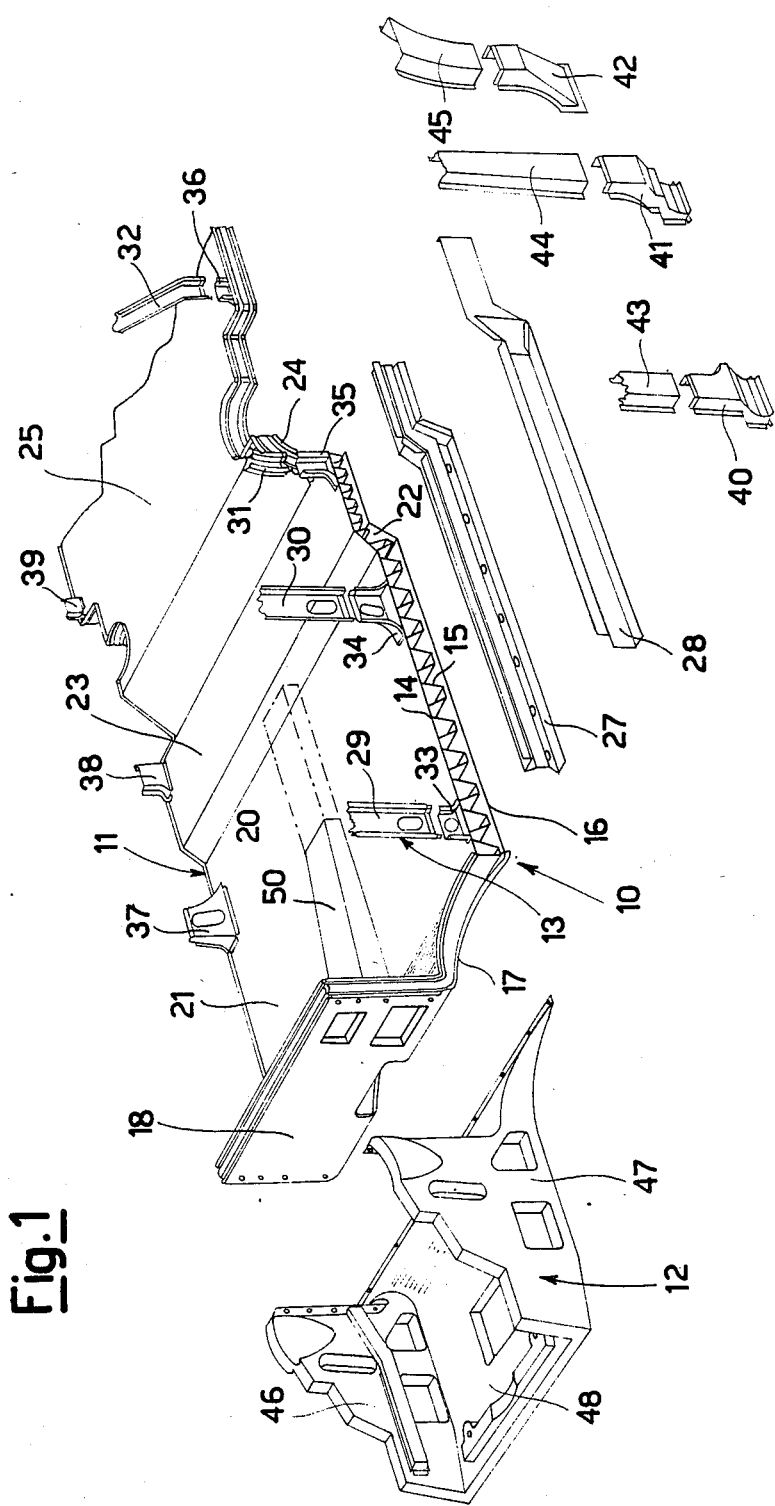
FIG. 1 shows a side-front perspective view of the bodywork according to the invention.

In FIG. 1, with 10 the bodywork is generally indicated, which is equipped with a floor pan, formed by a platform chassis, accomplished according to the invention; with 11, 12, 13, the floor pan, the auxiliary chassis, the upper framework of the same bodywork 10 are shown. The floor pan 11, the auxiliary chassis 12 and the upper framework 13 are made integral with each other by means of connection means, which are disclosed in detail in the following.

The floor pan 11 has a structure of "sandwich"type construction and is formed by three overlapping metal sheets 14, 15, 16 which are constructed of steel sheet. Sheets 14 and 16, which are the upper sheet and the lower sheet, respectively and have configurations similar to each other. Sheets 14 and 16 are sheared along a pre-established boundary and are bent to yield simple-curvature surfaces, such as a ruled surface. The intermediate sheet 15 is corrugated, and has the crests of the undulations made alternatingly integral with the upper sheet 14 and the lower sheet 16, by a continuous welding, e.g., accomplished by a laser process, or by bonding by means of structural adhesives.

In order to increase the flexural and tensile stiffness of the floor pan 11, the hollows between the metal sheets 14, 15, 16 can be filled, at least partially, with a foam of a foamed plastic material. The metal sheets 14 and 16 can be partially dished.

In the example of FIG. 1, the metal sheets 14 and 16 are bent at their front portion 17, according to a preselected bending radius, to form a fireproof wall 18, which separates the front compartment from the passenger compartment 20, and supports the dashboard, the pedals and the steering column of the car. Special openings are provided in the wall 18 to enable the steering column and the mechanical members connected with the pedals to pass through the wall. The metal sheets 14 and 16 have a portion extending horizontally, to form the floor pan 21 which supports the front seats of the car, not shown. The sheets 14 and 16 are bent in their central region at 22, along a preselected curvature radius, to form the plane 23 which supports the rear seats, not shown. Finally, the sheets 14 and 16 are further bent at 24, along a preselected bending radius, to form the plane 25 which supports the rear boot.

The floor pan is provided with an opening to which a tunnel of metal plate 50 is attached. In the tunnel the speed gear, is housed. In particular, the tunnel 50 could also be extended, as indicated by the chain lines, to allow the passage of a transmission shaft, not shown. In the case where the car is a rear-drive car, or a front and rear wheel drive the tunnel 50 can be used. The sides of the floor pan 11 are closed by box beams, such as the one shown in FIG. 1, wherein the two half-shells 27 and 28 are shown detached from each other. The half-shell 27 is welded to the edges of the sheets 14 and 16 of the floor pan 11, and to it the outer half-shell 28 is subsequently welded.

Also the uprights of the upper framework 13 are formed by box beams. In FIG. 1 the internal half-shells 29, 30, 31, 32 thereof are partially shown, which are welded to the internal bases 33, 34, 35, 36. The internal bases are fastened in their turn, by a continuous weld, to the metal sheet 14 of the floor pan 11. The internal bases fastened onto the other side of the floor pan are indicated at 37, 38, 39. In FIG. 1 there are shown, detached, the external bases 40, 41, 42, and the external half-shells 43, 44, 45, which are welded to the corresponding internal half-shells, to form the uprights of the framework 13.

The external bases 40, 41, 42 are also welded to the external half-shell 28 of the beam which closes laterally the floor pan 11.

In the FIG. 1, the longitudinal members and the crossbeams, they too formed by box beams, which complete the framework 13, are not shown.

Figure 3:
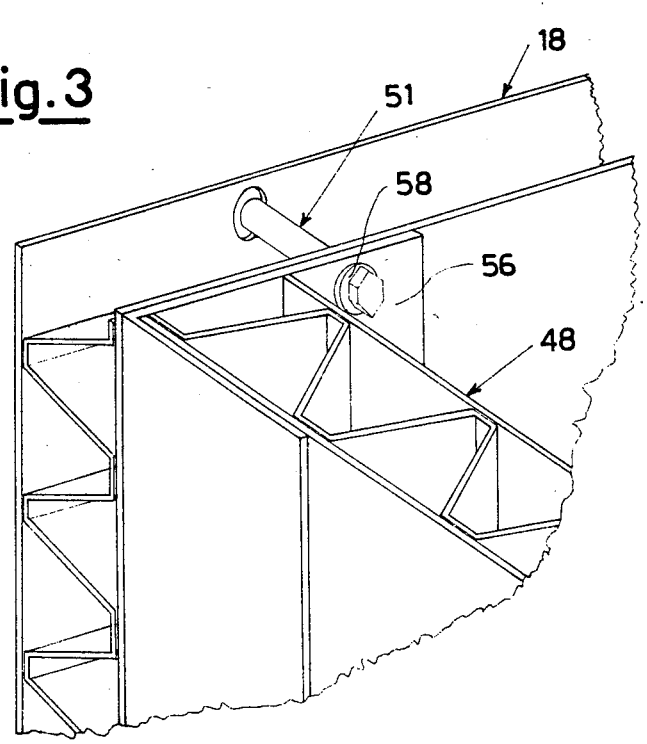

The fireproof wall 18 is fastened by means of fastening elements such as those shown in FIG. 3. The auxiliary chassis 12, is formed by the side walls 46 and 47, and by the bracket 48. Both the side walls and the bracket are formed by walls having a "sandwich" structure, with two outer metal sheets (14 and 16) and an interposed corrugated metal sheet (15), and closure box beams.

The auxiliary chassis 12, which could be also made in a more traditional way from pressed metal sheet and box beams, supports the drive unit of the car. Hence, through its side walls 46 and 47, and through the bracket 48, openings are provided which allow the passage of the related mechanical units, such as the arms of the steering assembly and the axle shafts, in case the vehicle is of the front-drive type.

The floor pan 11, supports the mechanical members and the dressing components of the car; none of which are shown. These are known from the prior art. Using the same floor pan, the upper framework can support the panels of the skin of the car; also not shown, in that this can be easily accomplished by those skilled in the art.

Figure 2:
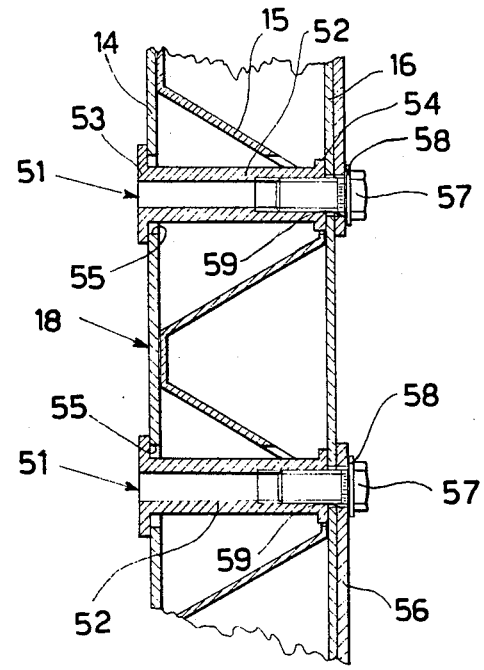
FIGS. 2 and 3 show details of the constraining means for parts of the bodywork shown in FIGS. 1 and 2.

In FIGS. 2 and 3, constraint elements 51 are shown. They are used for fastening the auxiliary chassis 12 to the wall 18, and are also particularly suitable for supporting those mechanical members which undergo strong stresses during the operation of the car.

Each member 51 is formed by a sleeve 52, provided with auxiliary end flanges 53 and 54, which is inserted inside special bores 55 provided in the "sandwich" structure of the wall 18 (or of the auxiliary chassis 12). Flange 53 is welded to the metal sheet 14 of the same wall 18, in direct correspondence of the flange 54. Flange 54 comes to rest against the other sheet 16 of the "sandwich" structure.

Inside each sleeve 52 a screw 57 is screwed down, after that a respective washer 58 has been interposed, after the preliminary insertion of flanges 56, provided with bores 59, which are welded to the walls 47 and 48 of the auxiliary chassis 12.

Thanks to this solution, all the three metal sheets of the "sandwich" structure contribute to react to the stresses due to the forces which are applied to the different parts of the floor pan and of the auxiliary chassis.

In FIG. 4 the process of manufacturing of a car with a bodywork like that shown in FIG. 1 is represented by a block diagram.

In FIG. 4, three metal sheet coils 61, 62, 63 are shown, which are fed to the processing station, represented by the block 64, wheren the floor pan 11 and the auxiliary chassis 12 are manufactured. At this station, the metal sheets are sheared and bent, and arranged to the configuration as indicated with the numerals 14, 15, 16 in FIG. 1.

The metal sheets 14, 15, 16 are welded to each other, e.g., by a laser process, or bonded by structural adhesives, to form the "sandwich" structure of the chassis 11. It is completed by the addition of the box beams, like that formed by the parts 27 and 28 shown in FIG. 1. This completion is performed in the subsequent station, represented by the block 65.

The closure box beams are manufactured by pressing in the station 67, fed by the metal coil 66, and by subsequent welding in station 68, from which they are sent to station 65.

In the same stations 67 and 68 the box beams which form the upper framework 13 are manufactured. These are sent to the station 69, and are welded to the floor pan 11, which comes from the station 65.

In the station represented by the block 70 the operations of painting of the bodywork formed by the floor pan 11, the auxiliary frame 12 and the framework 13 are carried out.

In the subsequent station, represented by the block 71, the end assemblage is carried out of the car with the bodywork coming from the station 70, and with the mechanical or dressing sub-units or components.

In FIG. 4, with the arrows 72, 73, 74, 75 the feed lines of the engine-speed gear assembly, of the steering sub-units or components, of the suspensions, of the wheels and of the brakes are respectively indicated.

The arrows 76, 77, 78, 79 indicate the feed lines of respectively the dashboard and seats, of the upholstery and internal and external accessories, of the panels of the skin, of bonnets and doors.

I claim:

1. A bodywork for an automobile, said bodywork comprising a floor pan formed by a platform chassis, an upper framework and an auxiliary chassis, which are made integral with each other, said floor pan having a sandwich type structure formed by three overlapping metal sheets, two sheets of said metal sheets having configurations similar to each other, said two sheets having a portion of their lengths which are curved, a third sheet of said metal sheets being corrugated with crests of undulations, said third sheet being interposed between said two sheets, said crests being alternatively integrally attached with said two sheets.

2. The bodywork according to claim 1, wherein said auxiliary chassis is formed by two side walls and a bracket, said side walls and said bracket each has a sandwich type structure, said sandwich type structure of the auxiliary chassis is fomred by three overlapping metal sheets, one of said metal sheets is an intermediate sheet which is interposed between the other two of said metal sheets said intermediate sheet is corrugated with crests of its undulations being alternatively integrally attached with the other two metal sheets.

3. The bodywork according to claims 1 or 2, wherein the sandwich type structure is formed with the crests of the undulations being welded to the other metal sheets by means of continuous welds.

4. The bodywork according to claims 1 or 2, wherein the sandwich type structure is formed with the crests of the undulations being bonded to the other metal sheets by structural adhesives.

5. The bodywork according to claim 1, wherein hollows formed between the sheet which is corrugated and the other two metal sheets are at least partially filled with a foam of expanded plastics material.

6. A process for manufacturing a bodywork of an automobile wherein the bodywork consist of a floor pan, an upper framework and an auxiliary chassis with at least the floor pan being of a sandwich type structure, said process for forming the sandwich type structure comprising:

first, step of corrugating a first sheet of metal to form crests of undulations; Second, step of forming a second and a third sheet of metal with substantially similar configurations; Third, step of curving a portion of each of the second and third sheets wherein the curved portions being substantially identical; Fourth, step of positioning the corrugated first sheet between the second and third sheets with the crests of undulations being arranged alternatively to be integral with the second and third sheets, and Fifth, step of manufacturing the auxiliary chassis which includes two side walls and a bracket wall each of the sandwich type structure, the fifth step includes repeating steps one through four to produce the sandwich type structure.

7. The process according claim 6, including a step of securing the crests of the undulated corrugated sheet to the second and third sheets by continuously welding along the crests.

8. The process according to claim 6, including a step of securing the crests of the undulated corrugated sheet to the second and third sheets using structural adhesives.

9. The process according to claim 6, including a step of filling with foam expanded material hollows which are formed between the corrugated sheet and the second and third sheets.

10. The process according to claim 6, including a step of coating the bodywork with paint.

* * * * *